United States Patent
Pratt (10) Patent No.: US 11,168,615 B1
(45) Date of Patent: Nov. 9, 2021

(54) DOUBLE RING AXIAL SEALING DESIGN

(71) Applicant: Raytheon Technologies Corporation, Farmington, CT (US)

(72) Inventor: William S. Pratt, Farmington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/001,981

(22) Filed: Aug. 25, 2020

(51) Int. Cl.
  *F01D 5/30* (2006.01)
  *F01D 11/08* (2006.01)
  *F02C 7/28* (2006.01)

(52) U.S. Cl.
  CPC .............. *F02C 7/28* (2013.01); *F01D 5/3007* (2013.01); *F01D 11/08* (2013.01); *F05D 2220/32* (2013.01); *F05D 2240/55* (2013.01)

(58) Field of Classification Search
  CPC .......... F01D 5/3007; F01D 11/08; F02C 7/28; F05D 2220/32; F05D 2240/55
  See application file for complete search history.

(56) References Cited

U.S. PATENT DOCUMENTS

| | | | | |
|---|---|---|---|---|
| 3,572,966 A | * | 3/1971 | Borden | F01D 5/081 416/95 |
| 4,019,833 A | * | 4/1977 | Gale | F01D 5/30 416/220 R |
| 4,648,799 A | * | 3/1987 | Brown | F01D 5/3015 416/220 R |
| 4,669,959 A | * | 6/1987 | Kalogeros | F01D 5/3015 415/199.5 |
| 4,730,983 A | * | 3/1988 | Naudet | F01D 11/006 416/220 R |
| 4,854,821 A | * | 8/1989 | Kernon | F01D 5/3015 416/95 |
| 5,173,024 A | * | 12/1992 | Mouchel | F01D 11/006 416/220 R |
| 8,096,776 B2 | * | 1/2012 | Bluck | F01D 5/3015 416/221 |
| 8,128,373 B2 | * | 3/2012 | Webb | F01D 5/3015 416/220 R |
| 9,803,485 B2 | | 10/2017 | Snyder | |
| 10,215,037 B2 | | 2/2019 | Caprario | |
| 10,526,904 B2 | | 1/2020 | Weinert et al. | |
| 2012/0034087 A1 | * | 2/2012 | Dungs | F01D 5/3015 416/219 R |

* cited by examiner

*Primary Examiner* — Igor Kershteyn
(74) *Attorney, Agent, or Firm* — Bachman & LaPointe, P.C.

(57) ABSTRACT

A double ring axial seal for a disk and blade; the disk including an array of blade slots at a perimeter of the disk configured to receive a root portion of the blade, the blade includes a platform located between the root portion and an airfoil extending from the platform opposite the root portion, the platform including a receiver with an overhang proximate the root portion and the platform including a hook opposite the receiver proximate the root portion; a disk slot formed on a first side of the disk proximate the array of blade slots; a first axial seal ring coupled with the disk slot and the receiver; the first axial seal ring having a cutout proximate an outer perimeter of the first axial seal ring, the cutout sized to receive the overhang of the blade platform.

19 Claims, 7 Drawing Sheets

DOUBLE RING AXIAL SEALING DESIGN

This invention was made with Government support awarded by the United States. The Government has certain rights in this invention.

BACKGROUND

The present disclosure is directed to a double ring axial seal, and more particularly forward and aft locking seals are positioned 180 degrees apart for balance and sealing purposes.

A gas turbine engine includes a fan section, a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The compressor and turbine sections include a series of alternating rotors and stators. Turbine and compressor rotors may include a rotor disk and a plurality of circumferentially spaced turbine blades. Rotor disks may include cover plates attached thereto.

In order to achieve better fuel consumption in a gas turbine engine, higher overall pressure ratios are required, which come with higher compressor discharge temperatures. High compressor temperatures threaten the structural life of the compressor components, and often dictate switching from integrally bladed rotors to axially bladed rotors in order to move the disk material away from the hot gas path. However, sealing axial blades properly is a challenge, and undesired leakage can lead to low compressor efficiency and hotter temperatures.

SUMMARY

In accordance with the present disclosure, there is provided a double ring axial seal for a disk and blade comprising the disk including an array of blade slots at a perimeter of the disk configured to receive a root portion of the blade, the blade includes a platform located between the root portion and an airfoil extending from the platform opposite the root portion, the platform including a receiver with an overhang proximate the root portion and the platform including a hook opposite the receiver proximate the root portion; a disk slot formed on a first side of the disk proximate the array of blade slots; a first axial seal ring coupled with the disk slot and the receiver; the first axial seal ring comprising a cutout proximate an outer perimeter of the first axial seal ring, the cutout sized to receive the overhang of the blade platform, the receiver comprising a contour configured to redirect the first axial seal ring axially toward the blade and disk for axial sealing; and a second axial seal ring inserted into the hook of the blade platform proximate the array of blade slots adjacent a disk face on a side of the disk opposite the first axial seal ring.

A further embodiment of any of the foregoing embodiments may additionally and/or alternatively include the contour comprises a sloped region configured to axially redirect an outer perimeter of the first axial seal ring responsive to a radial extension of the first axial seal ring into the contour.

A further embodiment of any of the foregoing embodiments may additionally and/or alternatively include the disk slot comprises a full hoop slot that extends around a circumference of the disk.

A further embodiment of any of the foregoing embodiments may additionally and/or alternatively include the double ring axial seal further comprises a first anti-rotation blade coupled to the disk proximate the first axial seal ring cutout, the first anti-rotation blade having an anti-rotation feature configured to prevent the first axial seal ring from rotating.

A further embodiment of any of the foregoing embodiments may additionally and/or alternatively include the anti-rotation blade is provided in the absence of a receiver.

A further embodiment of any of the foregoing embodiments may additionally and/or alternatively include the double ring axial seal further comprises a second anti-rotation blade coupled to the disk proximate the second axial seal ring 180 degrees from the first anti-rotation blade, the second anti-rotation blade provided in the absence of the hook and configured to prevent the second axial seal ring rotation.

A further embodiment of any of the foregoing embodiments may additionally and/or alternatively include the cutout is sized to allow the blade platform to pass through without interference responsive to insertion of the blade into the blade slot.

In accordance with the present disclosure, there is provided a gas turbine compressor rotor having a double ring axial seal comprising a compressor rotor disk including an array of blade slots at a perimeter of the compressor rotor disk configured to receive a root portion of a compressor blade, the compressor blade including a platform located between the root portion and an airfoil extending from the platform opposite the root portion, the platform including a receiver with an overhang proximate the root portion and the platform including a hook opposite the receiver proximate the root portion; a disk slot formed on a first side of the compressor rotor disk proximate the array of blade slots; a first axial seal ring coupled with the disk slot and the receiver; the first axial seal ring comprising a cutout proximate an outer perimeter of the first axial seal ring, the cutout sized to receive the overhang of the platform, the receiver comprising a contour configured to redirect the first axial seal ring axially toward the compressor blade and compressor rotor disk for axial sealing; and a second axial seal ring inserted into the hook of the platform proximate the array of blade slots adjacent a disk face on a side of the compressor rotor disk opposite the first axial seal ring.

A further embodiment of any of the foregoing embodiments may additionally and/or alternatively include the contour comprises a beveled edge configured to axially redirect an outer perimeter of the first axial seal ring responsive to a radial extension of the first axial seal ring away from an engine centerline into the contour.

A further embodiment of any of the foregoing embodiments may additionally and/or alternatively include the first axial seal ring comprises one of a full annular ring or a split annular ring.

A further embodiment of any of the foregoing embodiments may additionally and/or alternatively include the second axial seal ring comprises a split annular ring.

A further embodiment of any of the foregoing embodiments may additionally and/or alternatively include the gas turbine compressor rotor having a double ring axial seal according further comprising a first anti-rotation blade coupled to the compressor rotor disk proximate the first axial seal ring cutout, the first anti-rotation blade having an anti-rotation feature configured in the absence of a receiver in the platform to prevent the first axial seal ring from rotating.

A further embodiment of any of the foregoing embodiments may additionally and/or alternatively include the gas turbine compressor rotor having a double ring axial seal further comprises a second anti-rotation blade coupled to the compressor rotor disk proximate the second axial seal ring 180 degrees from the first anti-rotation blade, the second anti-rotation blade provided in the absence of the hook and configured to prevent the second axial seal ring rotation.

In accordance with the present disclosure, there is provided a process for sealing a gas turbine engine compressor rotor assembly comprising providing a compressor rotor disk including an array of blade slots at a perimeter of the compressor rotor disk configured to receive a root portion of a compressor blade, the compressor blade including a platform located between the root portion and an airfoil extending from the platform opposite the root portion, the platform including a receiver with an overhang proximate the root portion and the platform including a hook opposite the receiver proximate the root portion; a disk slot formed on a first side of the compressor rotor disk proximate the array of blade slots inserting a first axial seal ring into the disk slot; the first axial seal ring comprising a cutout proximate an outer perimeter of the first axial seal ring, the cutout sized to receive the overhang of the platform; individually inserting a compressor blade into each of the array of blade slots; passing the overhang axially through the cutout; inserting a second axial seal ring into the hook of the platform proximate the array of blade slots adjacent a disk face on a side of the compressor rotor disk opposite the first axial seal ring; redirecting the first axial seal ring axially toward the compressor blade and compressor rotor disk with a contour formed in the receiver responsive to a radial force acting on the first axial seal ring; and axially sealing the first axial seal ring against the compressor blade and the compressor rotor disk.

A further embodiment of any of the foregoing embodiments may additionally and/or alternatively include the process further comprises clocking the first axial seal ring, such that the cutout coincides with one of the array of blade slots and is configured to axially receive the overhang through the cutout; and rotating the perimeter of the axial seal ring into a receiver of one of the compressor blades.

A further embodiment of any of the foregoing embodiments may additionally and/or alternatively include the contour comprises a beveled edge configured to axially redirect an outer perimeter of the first axial seal ring responsive to a radial extension of the first axial seal ring away from an engine centerline into the contour.

A further embodiment of any of the foregoing embodiments may additionally and/or alternatively include the cutout is sized to allow the blade platform to pass through without interference responsive to insertion of the compressor blade into the blade slot.

A further embodiment of any of the foregoing embodiments may additionally and/or alternatively include the process further comprises inserting a first anti-rotation blade coupled to the compressor rotor disk proximate the first axial seal ring cutout, the first anti-rotation blade having an anti-rotation feature configured in the absence of a receiver in the platform to prevent the first axial seal ring from rotating.

A further embodiment of any of the foregoing embodiments may additionally and/or alternatively include the process further comprises inserting a second anti-rotation blade into the compressor rotor disk 180 degrees from the first anti-rotation blade, the second anti-rotation blade provided in the absence of the hook and configured to prevent the second axial seal ring rotation.

The disclosure can include a double ring axial sealing design that uses two rings to assemble the axial blades. First, a ring is loaded into a full hoop slot in the rotor on either side of the axial attachments. A slot machined in the ring allows the blades to be loaded axially from the other side of the ring. Each time a blade is loaded, the ring is clocked tangentially, shifting the loading slot to the next adjacent dovetail. The last blade that is loaded does not have a matching grove for the ring, and hence anti-rotates the first ring. Then, the second ring is loaded. The second ring, which is split in one location similar to the first, does not have a full-hoop grove in the case to load into. It is simply compressed and pressed onto the disk face, and allowed to expand naturally into the blade groves. The gap in the second ring is oriented relative to a second unique blade that does not have a matching slot, anti-rotating the ring. This second unique blade should be located 180 degrees away from the first unique blade so as to balance the rotor and maximize the distance leakage air has to travel in order to pass through the sealing mechanism.

Other details of the double ring axial sealing design are set forth in the following detailed description and the accompanying drawings wherein like reference numerals depict like elements.

DETAILED DESCRIPTION

Figure 1:
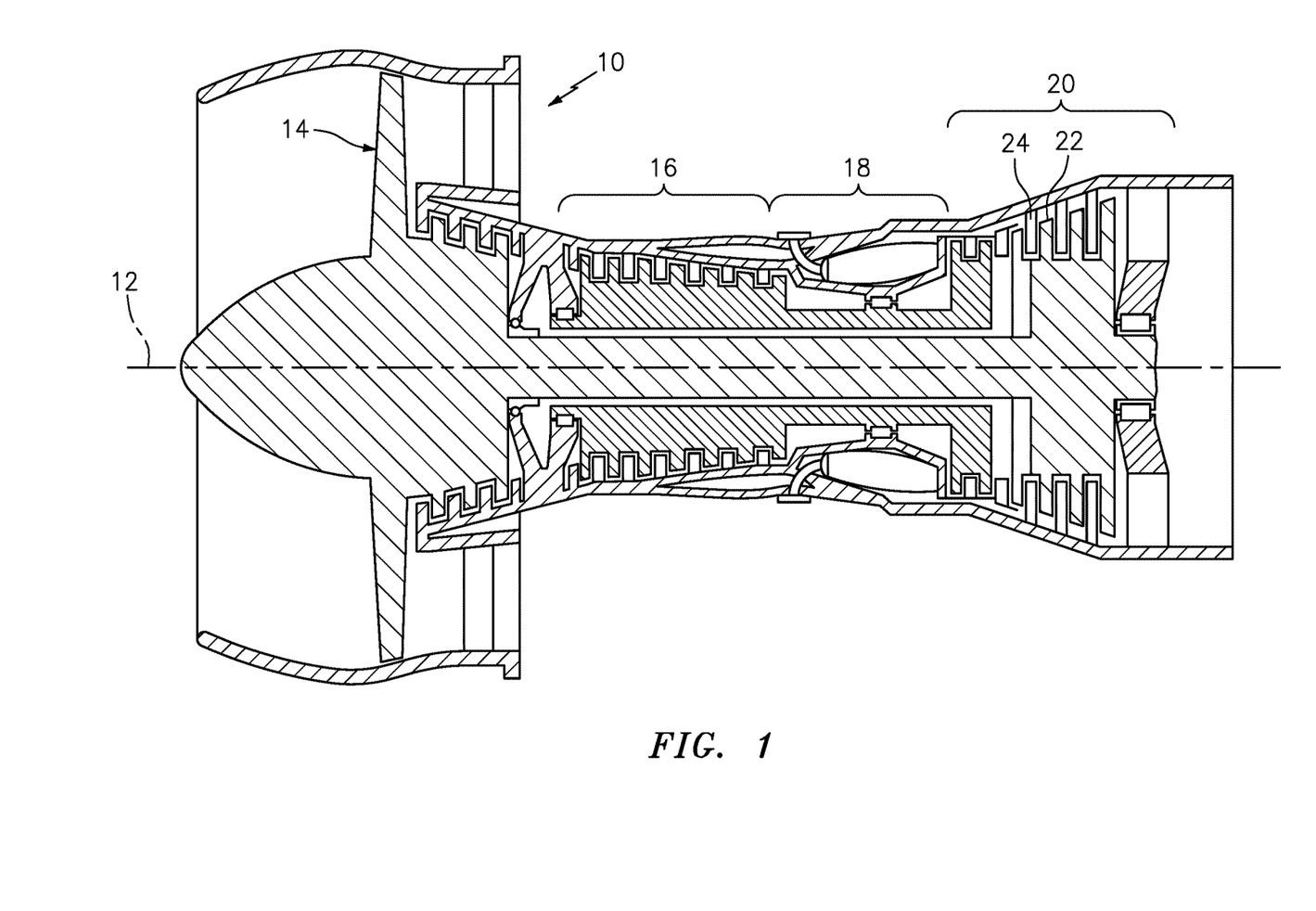
FIG. 1 is a schematic representation of an exemplary turbine engine.

FIG. 1 illustrates selected portions of an exemplary gas turbine engine 10, such as a gas turbine engine 10 used for propulsion. In this example, the gas turbine engine 10 is circumferentially disposed about an engine centerline 12. The engine 10 may include a fan 14, a compressor 16, a combustion section 18, and a turbine section 20 that includes rotating turbine blades 22 and static turbine vanes 24. It is to be understood that other types of engines may also benefit from the examples disclosed herein, such as engines that do not include a fan or engines having other types of compressors, combustors, and turbines.

Figure 2:
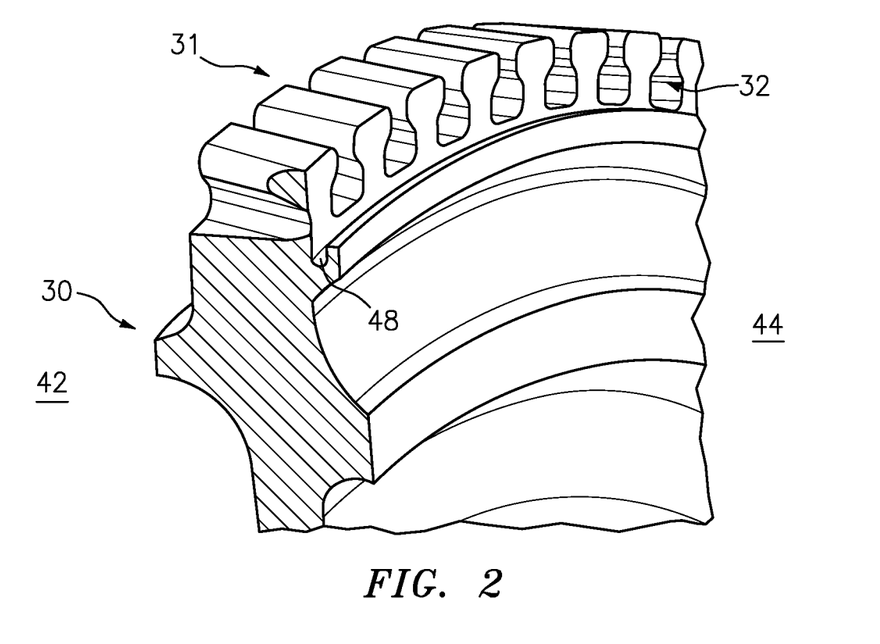
FIG. 2 is a partial cross-sectional view of an exemplary disk.
Figure 3:
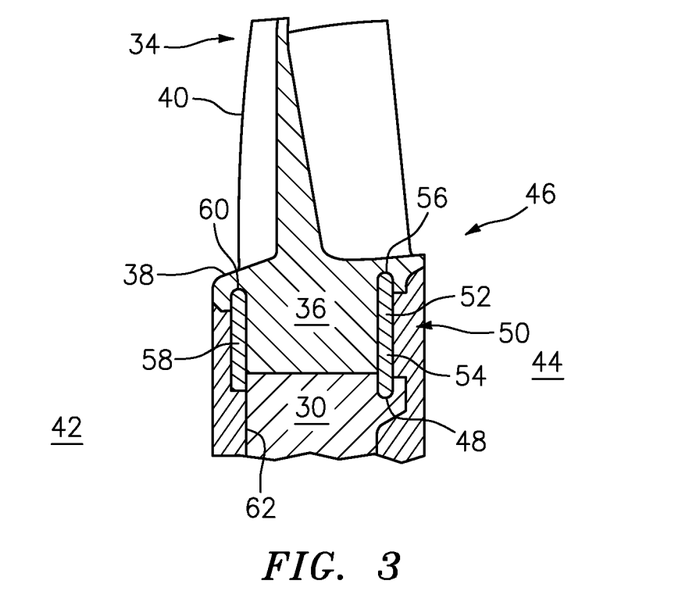
FIG. 3 is a cross-sectional view of an exemplary blade coupled to a disk with exemplary double ring axial seals.
Figure 4:
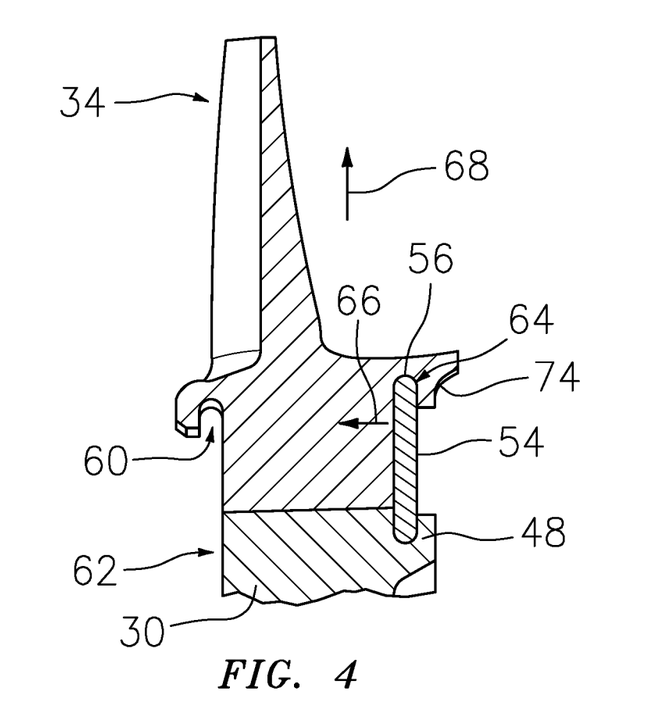
FIG. 4 is an isometric view of an exemplary axial seal coupled to a disc with exemplary blade.

Referring to FIG. 2 and FIG. 3 the exemplary rotor disk 30 is shown. The disk 30 can be configured with an array of axial broached blade slots 32 formed in an outer perimeter 31 of the disk 30. Each blade slot 32 is configured to receive a blade 34 proximate a root portion 36 of the blade 34. The blade 34 includes the root portion 36 with a platform 38 located between the root portion 36 and an airfoil 40 extending from the platform 38 opposite the root portion 36. The root portion 36 is insertable into the blade slot 32 for mounting the blade 34 to the disk 30. In the exemplary embodiment depicted in FIG. 3, a forward side 42 of the disk 30 is shown with the aft side 44 of the disk 30 opposite the forward side 42. The forward side 42 can be considered to be the cool side of the disk 30 and the aft side 44 can be considered the hot side of the disk 30. It is contemplated that this orientation can be the opposite. The platform 38 can be sloped 46 to conform with a sloped flowpath across the blades 34. The slope 46 can influence the aft 44 portion of the platform 38 such that the aft portion 44 is at an elevation higher than the forward 42 portion of the platform 38 relative to the engine centerline 12 or vice versa. The flowpath geometry can dictate the assembly and location of the forward side 42.

The disk 30 includes a full hoop disk slot, or simply disk slot 48. The disk slot 48 can extend axially from the disk 30 below the blade slots 32. The disk slot 48 extends around a circumference 84 of the disk 30. The disk slot 48 is configured to receive an axial seal 50. The axial seal 50 can be shaped as a planar ring 52. The axial seal 50 can be a full annular ring or a split annular shape ring depending on the configuration of the engine 10 and disks 30. In certain engine 10 configurations, the axial seal 50 can be a split ring shape to allow for installation and removal in order to flex the ring open to obtain clearance past engine components. In an exemplary embodiment, the disk slot 48 is located on the cooler side of the disk 30.

In the exemplary embodiment shown at FIG. 3, there are two axial seal rings 50, a first or aft axial seal ring 54 located between the disk slot 48 and an aft receiver 56 formed in the platform 38 proximate the root 36. A second or forward axial seal ring 58 can be located opposite the aft axial seal ring 54 on the forward 42 side of the disk 30 and coupled to the platform 38 in a forward hook 60. The forward axial seal 58 can be split in one location similar to the first axial seal ring 54, and does not have a full-hoop grove in the case to load into. It is simply compressed and pressed onto the disk face 62, and allowed to expand naturally into the blade platform 38 hook 60. In an exemplary embodiment, the location of the disk slot 48 can be on the opposite side as shown, and thus the seal 54, 58 arrangement can be switched. The arrangement of the aft axial seal ring 54 and the forward axial seal ring 58 can be based on the slope 46 of the flow path.

Referring further to FIG. 4, FIG. 5, FIG. 6 and FIG. 7, the shape of the aft receiver 56 can be configured with a contour 64 or other shape, to impart an axial force 66 on the aft axial seal ring 54. The contour 64 can be a sloped region, or beveled edge and the like, so that as the outer perimeter 72 of the aft axial seal ring 54 is pressed into the contour 64, the aft axial seal ring 54 is pressed axially against the blade 34 and disk 30. The axial force 66 can push the aft axial seal ring 54 against the blade 34 and disk 30 improving the seal between the components. As the disk 30, blade 34 and axial seal ring 54 are rotated, centrifugal forces push the axial seal ring 54 radially into the aft receiver 56. The radial forces 68 press the axial seal ring 54 into the contour 64. The contour 64 redirects the aft axial seal ring 54 inward axially toward the blade 30 and disk 30 translating the radial force 68 into axial force 66. The contour 64 can include a slope or bevel, or radius and the like in the receiver 56 or other shape that can influence the aft axial seal ring 54 to press against the blade 34 and disk 30 for axial sealing.

Figure 5:
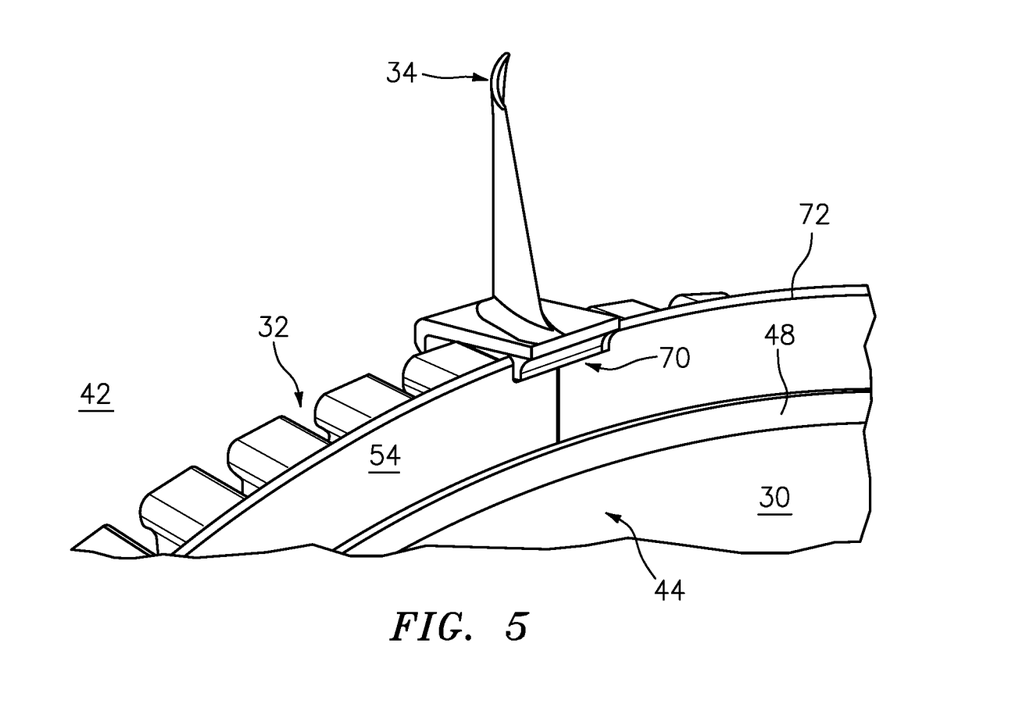
FIG. 5 is cross-sectional view of an exemplary blade and disk with an exemplary seal.
Figure 6:
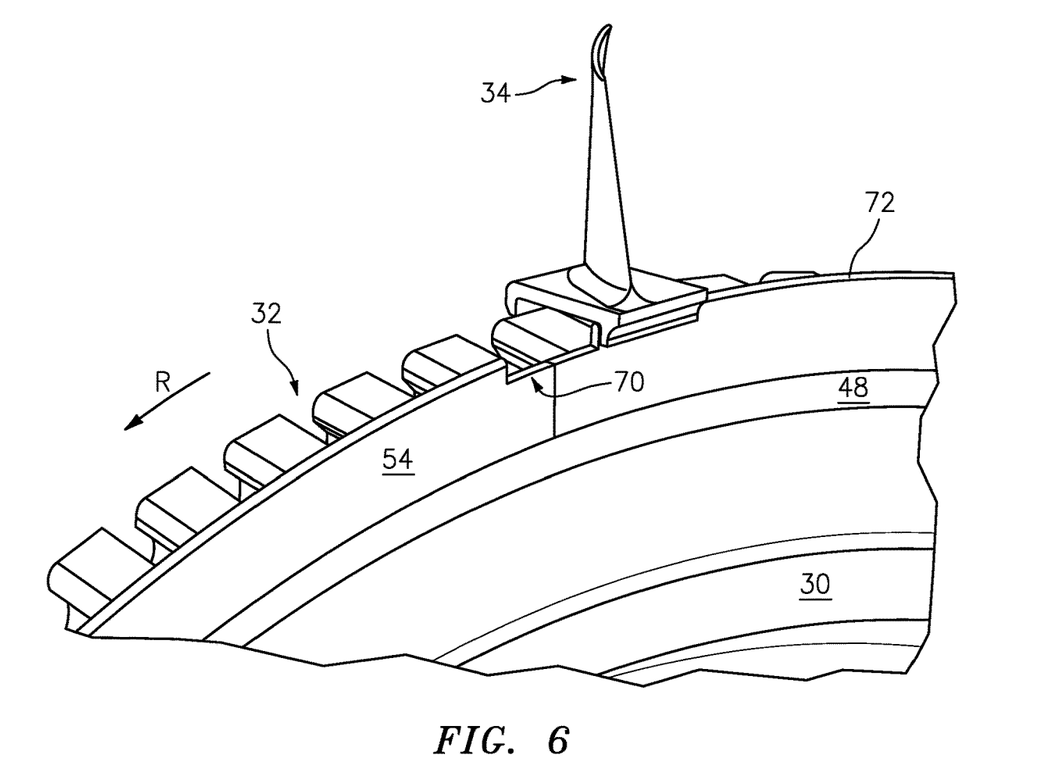
FIG. 6 is an isometric view of an exemplary axial seal coupled to a disc with exemplary blade.

In order to load the blades 34 into the disk slots 32 onto the disk 30, the blades 34 are loaded from the forward side 42. The aft axial seal ring 54 has a cutout 70 formed along an outer perimeter 72. The outer perimeter 72 of the aft axial seal ring 54 is radially external from the disk slot 48 and proximate to the aft receiver 54 of the blade platform 38. The cutout 70 can be sized to allow the blade platform 38 to pass through without interference. The cutout 70 can be a rectilinear shape as shown at FIG. 5 and FIG. 6. The cutout 70 is shown proximate the split in the aft axial seal ring 54, but could be located anyplace along the outer perimeter 72. The depth of the cutout 70 can be configured to allow the overhang 74 in the aft portion of the platform 38 to pass through the cutout 70.

Figure 7:
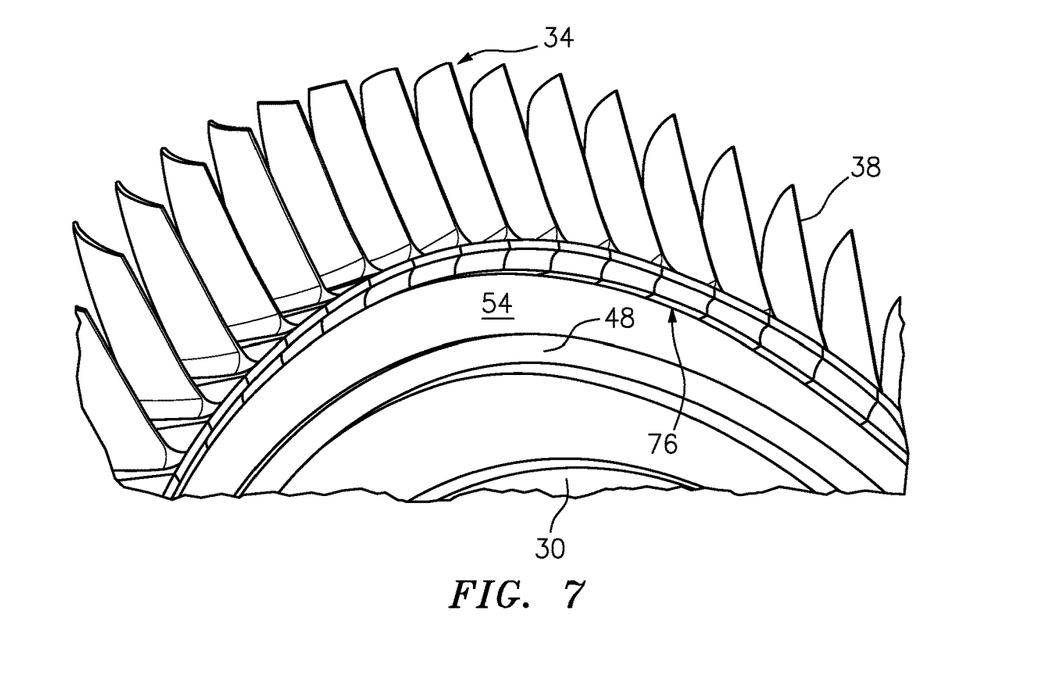
FIG. 7 is an isometric view of an exemplary disk with an array of blades and exemplary axial seal.

As seen in a sequence from FIG. 5 to FIG. 6 the aft axial seal ring 54 can be (tangentially clocked) rotated R, or clocked to align with the next available blade slot 32 in the disk 30. The next blade 34 can then be loaded. The cutout 70 is aligned with the blade slot 32 to allow the blade platform overhang to pass over the aft axial seal ring 54. The disk 30 can be loaded with each subsequent blade 34 until all blades 34 are loaded, as seen in FIG. 7. The blade platforms 38 can form a uniform sealing surface 76 for retaining the aft axial seal ring 54.

Figure 8:
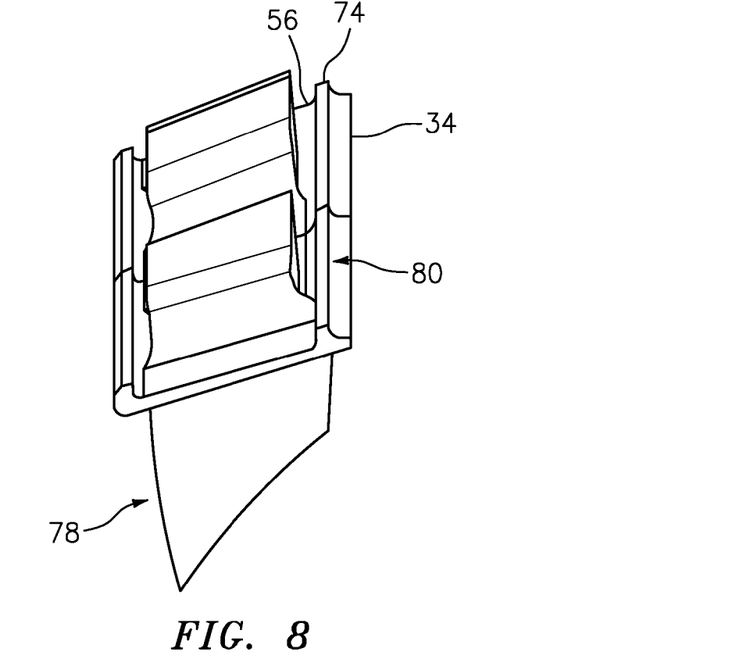
FIG. 8 is an isometric view of portions of an exemplary blade.
Figure 9:
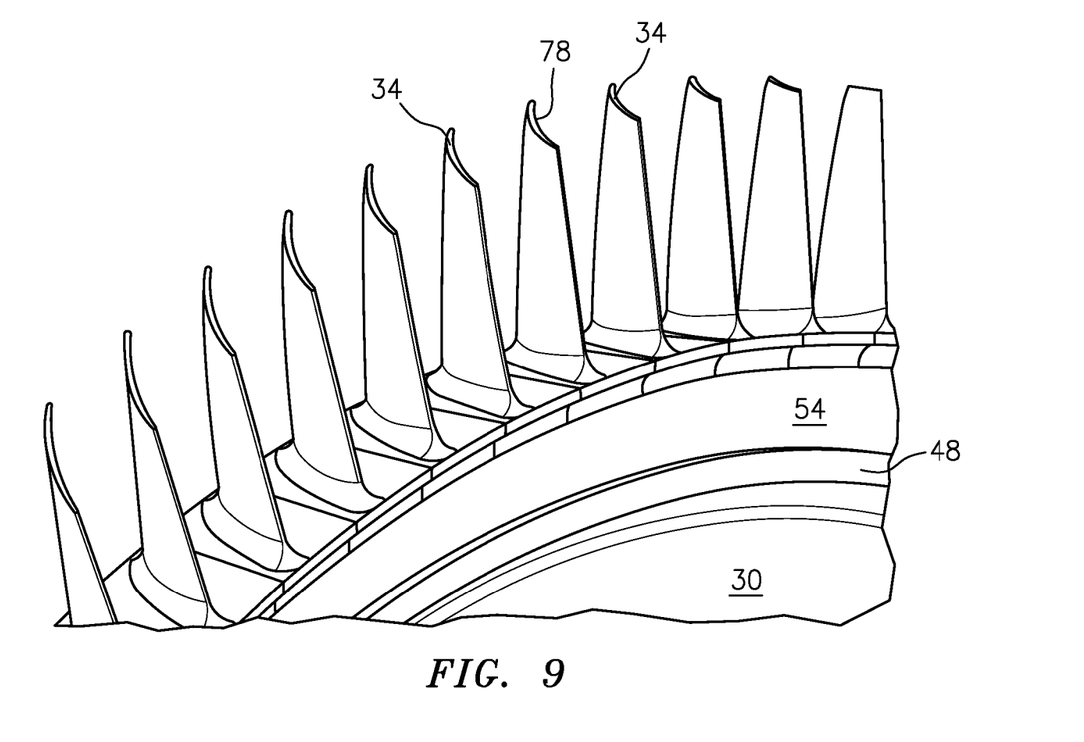
FIG. 9 is an isometric view of an exemplary disk with an array of blades and exemplary axial seal.

Referring also to FIG. 8, FIG. 9, the configuration in the disclosure includes a first anti-rotation blade 78 that is loaded into the disk 30 last. The anti-rotation blade 78 has no aft receiver 56. With no aft receiver 56 in the platform 38 of the anti-rotation blade 78 the aft axial seal ring 54 is prevented from rotating in the disk slot 48. The anti-rotation blade 78 includes an anti-rotation feature 80 of the assembly.

Figure 10:
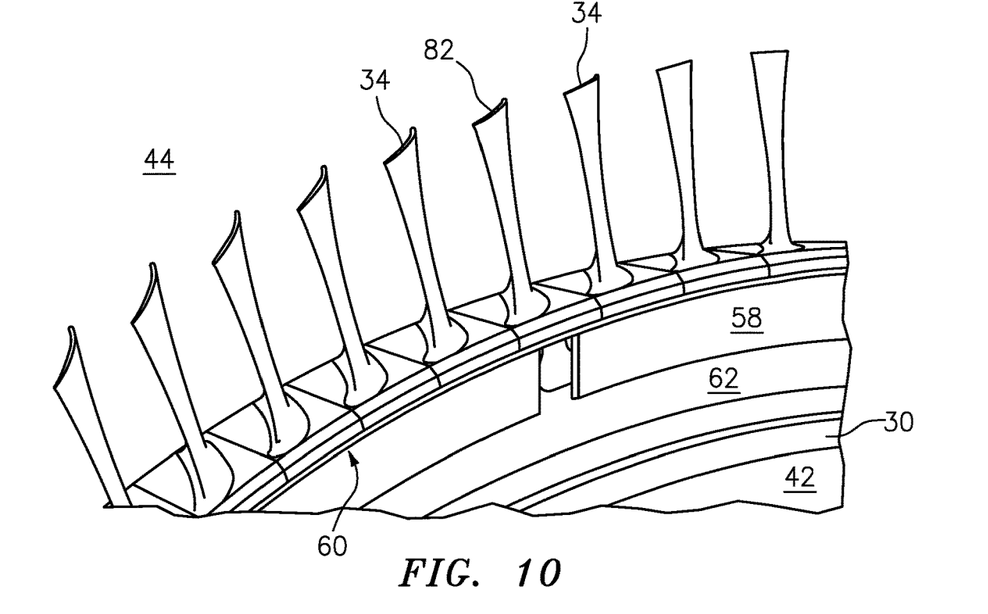
FIG. 10 is an isometric view of an exemplary disk with an array of blades and exemplary axial seal.
Figure 11:
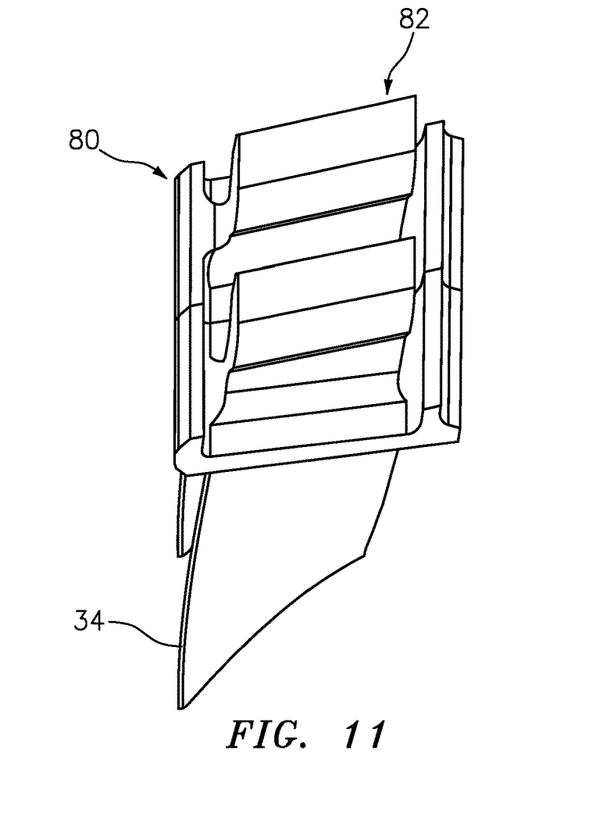
FIG. 11 is an isometric view of portions of an exemplary blade.

Referring also to FIG. 10 and FIG. 11, the configuration in the disclosure includes pressing the forward axial seal ring 58 against the disk face 62 on the forward side 42 of the disk 30. The forward axial seal ring 58 can simultaneously expand radially into the blade forward hooks 60. A second anti-rotation blade 82 can be deployed in order to prevent the forward axial seal ring 58 from rotation. The second anti-rotation blade 82 has no forward slot or hook 60. Thus, after the second anti-rotation blade 82 has been inserted, the forward axial seal ring 58 is blocked and prevented from rotating. The second anti-rotation blade 82 has the anti-rotation feature 80.

Figure 12:
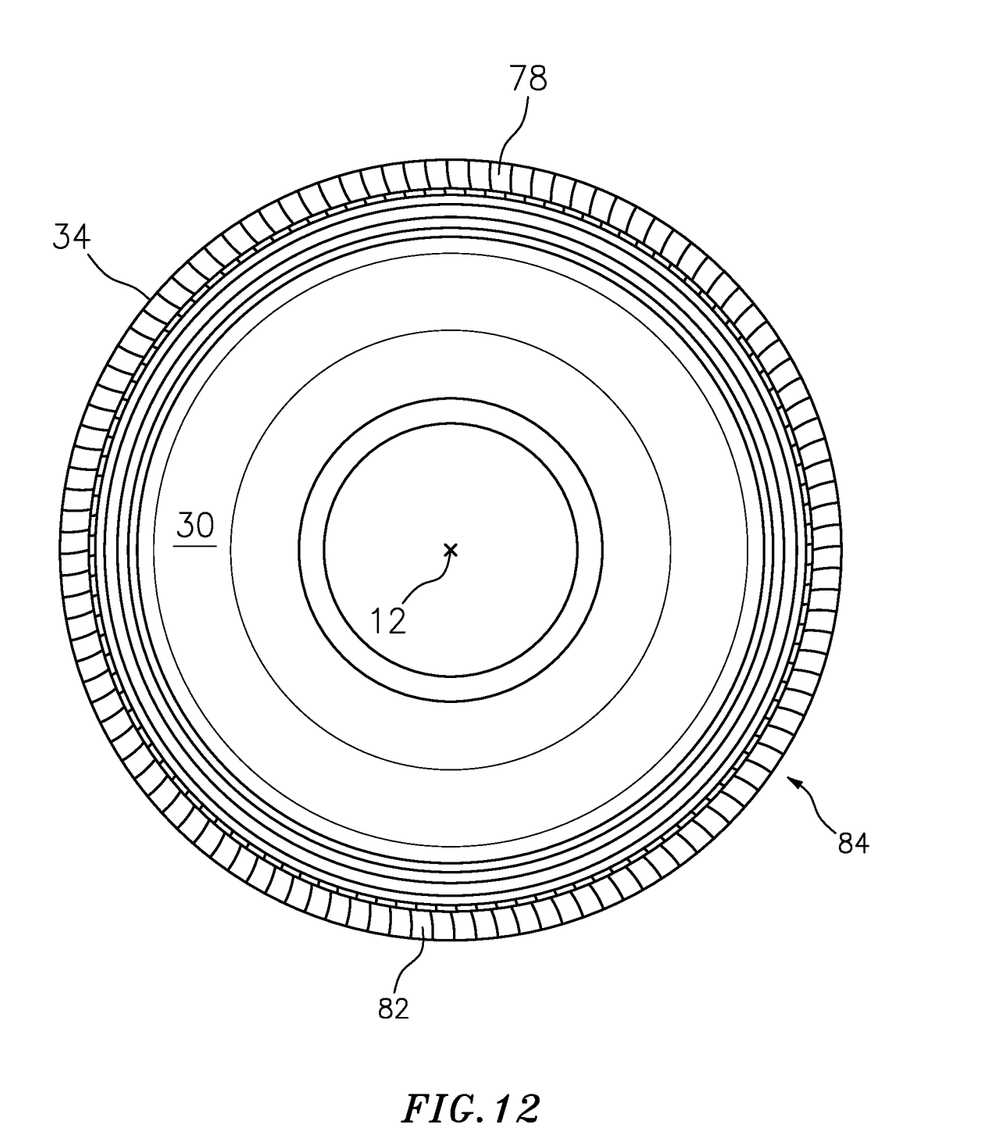
FIG. 12 is a side axial view of an exemplary disk with an array of blades and exemplary axial seal.

Also referring to FIG. 12, the disk 30 is shown with the blades 34 installed in the disk 30. Each of the first anti-rotation blade 78 and second anti-rotation blade 82 are installed 180 degrees apart in order to enable proper balance on the disk 30. The arrangement of having the first anti-rotation blade 78 and second anti-rotation blade 82 installed 180 degrees apart also maximizes the air sealing capacity of the axial seal rings 54, 58.

A technical advantage of the disclosed double ring axial sealing design limits the number of pieces and hence complexity, tolerances, and gaps.

A technical advantage of the disclosed double ring axial sealing design provides a robust design that holds the rotor together even when the rotor is not spinning.

A technical advantage of the disclosed double ring axial sealing design does not use any kind of paste or viscous substance to seal up leak paths from difficult to manufacture interfaces.

A technical advantage of the disclosed double ring axial sealing design improves the interface between the rings and blades by use of a contoured blade platform receiver to allow centrifugal pull to generate axial forces clamping the rings against the disk, further improving the sealing capability of the double ring axial sealing design.

There has been provided a double ring axial sealing design. While the double ring axial sealing design has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A double ring axial seal for a disk and blade comprising:
    the disk including an array of blade slots at a perimeter of the disk configured to receive a root portion of the blade, the blade includes a platform located between the root portion and an airfoil extending from the platform opposite the root portion, the platform including a receiver with an overhang proximate the root portion and the platform including a hook opposite the receiver proximate the root portion;
    a disk slot formed on a first side of the disk proximate the array of blade slots;
    a first axial seal ring coupled with said disk slot and said receiver; said first axial seal ring comprising a cutout proximate an outer perimeter of said first axial seal ring, said cutout sized to receive the overhang of the blade platform, said receiver comprising a contour configured to redirect the first axial seal ring axially toward the blade and disk for axial sealing; and
    a second axial seal ring inserted into said hook of said blade platform proximate the array of blade slots adjacent a disk face on a side of the disk opposite the first axial seal ring.

2. The double ring axial seal according to claim 1, wherein said contour comprises a sloped region configured to axially redirect an outer perimeter of the first axial seal ring responsive to a radial extension of the first axial seal ring into the contour.

3. The double ring axial seal according to claim 1, wherein said disk slot comprises a full hoop slot that extends around a circumference of the disk.

4. The double ring axial seal according to claim 1, further comprising:
    a first anti-rotation blade coupled to said disk proximate said first axial seal ring cutout, said first anti-rotation blade having an anti-rotation feature configured to prevent said first axial seal ring from rotating.

5. The double ring axial seal according to claim 4, wherein said anti-rotation blade is provided in the absence of a receiver.

6. The double ring axial seal according to claim 4, further comprising:
    a second anti-rotation blade coupled to said disk proximate said second axial seal ring 180 degrees from said first anti-rotation blade, said second anti-rotation blade provided in the absence of said hook and configured to prevent said second axial seal ring rotation.

7. The double ring axial seal according to claim 1, wherein said cutout is sized to allow the blade platform to pass through without interference responsive to insertion of said blade into said blade slot.

8. A gas turbine compressor rotor having a double ring axial seal comprising:
    a compressor rotor disk including an array of blade slots at a perimeter of the compressor rotor disk configured to receive a root portion of a compressor blade, the compressor blade including a platform located between the root portion and an airfoil extending from the platform opposite the root portion, the platform including a receiver with an overhang proximate the root portion and the platform including a hook opposite the receiver proximate the root portion;
    a disk slot formed on a first side of the compressor rotor disk proximate the array of blade slots;
    a first axial seal ring coupled with said disk slot and said receiver; said first axial seal ring comprising a cutout proximate an outer perimeter of said first axial seal ring, said cutout sized to receive the overhang of the platform, said receiver comprising a contour configured to redirect the first axial seal ring axially toward the compressor blade and compressor rotor disk for axial sealing; and
    a second axial seal ring inserted into said hook of said platform proximate the array of blade slots adjacent a disk face on a side of the compressor rotor disk opposite the first axial seal ring.

9. The gas turbine compressor rotor having a double ring axial seal according to claim 8, wherein said contour comprises a beveled edge configured to axially redirect an outer perimeter of the first axial seal ring responsive to a radial extension of the first axial seal ring away from an engine centerline into the contour.

10. The gas turbine compressor rotor having a double ring axial seal according to claim 8, wherein said a first axial seal ring comprises one of a full annular ring or a split annular ring.

11. The gas turbine compressor rotor having a double ring axial seal according to claim 8, wherein said second axial seal ring comprises a split annular ring.

12. The gas turbine compressor rotor having a double ring axial seal according to claim 8, further comprising:
    a first anti-rotation blade coupled to said compressor rotor disk proximate said first axial seal ring cutout, said first anti-rotation blade having an anti-rotation feature configured in the absence of a receiver in the platform to prevent said first axial seal ring from rotating.

13. The gas turbine compressor rotor having a double ring axial seal according to claim 12, further comprising:
    a second anti-rotation blade coupled to said compressor rotor disk proximate said second axial seal ring 180 degrees from said first anti-rotation blade, said second anti-rotation blade provided in the absence of said hook and configured to prevent said second axial seal ring rotation.

14. A process for sealing a gas turbine engine compressor rotor assembly comprising:
    providing a compressor rotor disk including an array of blade slots at a perimeter of the compressor rotor disk configured to receive a root portion of a compressor blade, the compressor blade including a platform located between the root portion and an airfoil extending from the platform opposite the root portion, the platform including a receiver with an overhang proximate the root portion and the platform including a hook opposite the receiver proximate the root portion;

a disk slot formed on a first side of the compressor rotor disk proximate the array of blade slots inserting a first axial seal ring into said disk slot; said first axial seal ring comprising a cutout proximate an outer perimeter of said first axial seal ring, said cutout sized to receive the overhang of the platform;

individually inserting a compressor blade into each of said array of blade slots;

passing said overhang axially through said cutout;

inserting a second axial seal ring into said hook of said platform proximate the array of blade slots adjacent a disk face on a side of the compressor rotor disk opposite the first axial seal ring;

redirecting the first axial seal ring axially toward the compressor blade and compressor rotor disk with a contour formed in the receiver responsive to a radial force acting on said first axial seal ring; and axially sealing said first axial seal ring against said compressor blade and said compressor rotor disk.

15. The process of claim 14, further comprising:

clocking said first axial seal ring, such that said cutout coincides with one of said array of blade slots and is configured to axially receive said overhang through said cutout; and rotating said perimeter of said axial seal ring into a receiver of one of the compressor blades.

16. The process of claim 14, wherein said contour comprises a beveled edge configured to axially redirect an outer perimeter of the first axial seal ring responsive to a radial extension of the first axial seal ring away from an engine centerline into the contour.

17. The process of claim 14, wherein said cutout is sized to allow the blade platform to pass through without interference responsive to insertion of said compressor blade into said blade slot.

18. The process of claim 14, further comprising:

inserting a first anti-rotation blade coupled to said compressor rotor disk proximate said first axial seal ring cutout, said first anti-rotation blade having an anti-rotation feature configured in the absence of a receiver in the platform to prevent said first axial seal ring from rotating.

19. The process of claim 18, further comprising:

inserting a second anti-rotation blade into said compressor rotor disk 180 degrees from said first anti-rotation blade, said second anti-rotation blade provided in the absence of said hook and configured to prevent said second axial seal ring rotation.

* * * * *